United States Patent
Beyer et al.

(10) Patent No.: US 7,180,915 B2
(45) Date of Patent: Feb. 20, 2007

(54) APPARATUS, AND AN ASSOCIATED METHOD, FOR FACILITATING SYNCHRONIZATION IN A WIRELESS MESH NETWORK

(75) Inventors: David A. Beyer, Los Altos, CA (US); Jori Arrakoski, Espoo (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 1018 days.

(21) Appl. No.: 10/028,344

(22) Filed: Dec. 21, 2001

(65) Prior Publication Data

US 2003/0117991 A1    Jun. 26, 2003

(51) Int. Cl.
*H04J 3/06* (2006.01)
(52) U.S. Cl. ...................... 370/516; 375/371
(58) Field of Classification Search ............ 370/389, 370/391, 474, 503, 350, 512, 516, 520; 375/354, 375/371
See application file for complete search history.

(56) References Cited

U.S. PATENT DOCUMENTS 6,198,736 B1    3/2001    Nyberg et al.
6,546,013 B1 *    4/2003    Huang et al. ............ 370/395.1
2002/0087999 A1 *    7/2002    Kashima ...................... 725/100
2003/0072564 A1 *    4/2003    Teunissen ...................... 386/111
2004/0133676 A1 *    7/2004    Stachura et al. ............ 709/224
2005/0237928 A1 *    10/2005    Le Scolan et al. ........... 370/223

FOREIGN PATENT DOCUMENTS

WO    WO 00 38361 A    6/2000
WO    WO 00 51366 A    8/2000
WO    WO 01 59965 A    8/2001

* cited by examiner

*Primary Examiner*—Ajit Patel
(74) *Attorney, Agent, or Firm*—Robert M. Bauer; Lackenbach Siegel LLP

(57) ABSTRACT

Apparatus, and associated method, by which to synchronize nodes in a wireless mesh network, such as a fixed broadband network or a moving ad-hoc mesh network. Time stamps are added to data packets at a reference node defined pursuant to a pseudo hierarchy. The data packets are communicated by the reference node to a receiving node. The time stamp information is extracted therefrom, to provide an indication of a time reference value from which the time stamp information is formed. Registers are maintained at the nodes with updated values of the timing information, used in time synchronization between the nodes of the mesh network.

18 Claims, 7 Drawing Sheets

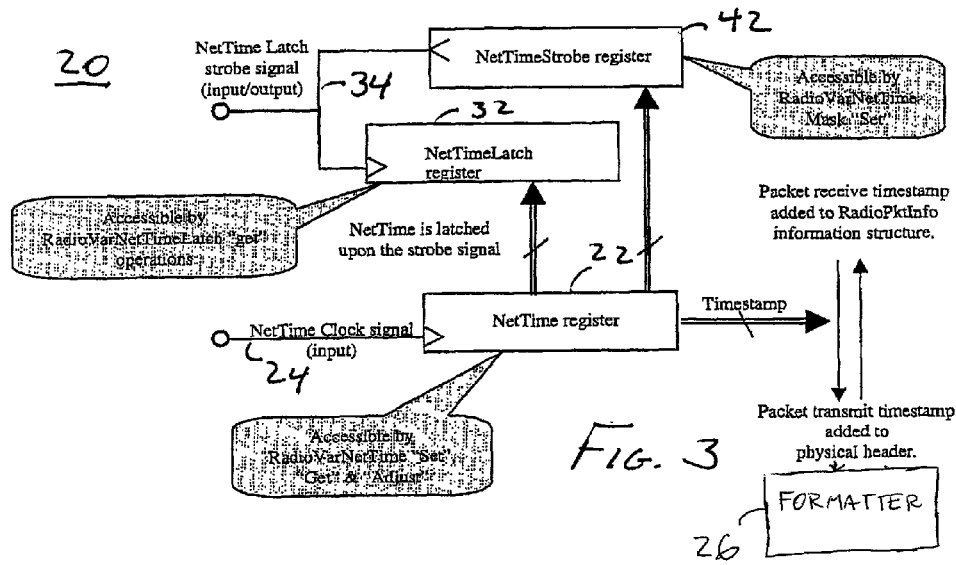

APPARATUS, AND AN ASSOCIATED METHOD, FOR FACILITATING SYNCHRONIZATION IN A WIRELESS MESH NETWORK

The present invention relates generally to a manner by which to facilitate time synchronization between nodes of a mesh network, such as a fixed broadband access network or a moving ad hoc mesh network. More particularly, the present invention relates to apparatus, and an associated method, by which to provide accurate time reference indicia to the nodes of the mesh network to permit time and clock synchronization pursuant to a synchronization hierarchy. Time stamps are added to data packets at a node at which an updated time reference value is maintained. When sent to another node, the time stamp is extracted to provide the other node with the updated time reference value. The time reference value is buffered and updated at a register and selectably retrieved therefrom to form the time stamp.

BACKGROUND OF THE INVENTION

Communication of data between remotely-positioned sending and receiving stations is a necessary adjunct of modern society. A wide variety of different types of communication systems have been developed and are regularly utilized to effectuate communication of data between the sending and receiving stations.

Communication technology advancements have permitted the development, and commercial implementation, of new types of communication systems. Radio communication systems are exemplary of communication systems which have benefited from the advancements in communication technologies. Improvements to existing types of radio communication systems, as well as new types of radio communication systems, have been made possible as a result of the advancements in communication technologies.

Use of a radio communication system inherently permits increased communication mobility in contrast to use of a conventional wireline communication system. Communication channels defined between sending and receiving stations of a radio communication system are defined upon radio links formed therebetween. The communication channels are referred to as radio channels and do not require fixed connections for their formation.

The advancements in communication technologies which have permitted the development and implementation of new types of communication systems include, for instance, digital communication techniques. The use of digital communication techniques permits the communication capacity of a communication system to be increased as well as also to improve the quality levels of communications effectuated in the communication system.

Information which is to be communicated in a digital communication system is digitized. Once digitized, the digitized information is formatted, such as into packets of data, referred to as data packets. Data packets are sent by a sending station upon the radio channel to the receiving channel, thereby to effectuate the communication of the data packets therebetween. Individual ones, or groups, of the packets can be communicated at discrete intervals, and, once communicated, the packets of data can be concatenated together to recreate the informational content of the transmitted information.

Because the packets of data can be sent at discrete intervals, a radio, or other, communication channel need not be dedicated solely for the communication of data pursuant to a single communication session between one sending station and one receiving station. A dedicated channel, in contrast, is required in conventional circuit-switched communications. In packet-switched communications, a single channel can be used pursuant to the effectuation of a plurality of different communication sessions. Improved communication capacity is possible due to the shared nature of the communication channels permitted in packet-switched communications.

A wireless mesh network is a radio communication system which can be constructed to provide for the communication of packet data pursuant, e.g., to a digital communication technique. A wireless mesh network typically includes a plurality of nodes, each node capable of communicating with at least one other node. A wireless mesh network is implemented, for instance, as a fixed broadband access network capable of communicating broadband data between fixed-site communication stations which form the nodes. A moving ad-hoc mesh network is also representative of a wireless mesh network.

Network synchronization is necessary in a wireless mesh network to properly utilize the radio resources available to communicate thereon. Transmission and reception scheduling is conventionally utilized in a wireless mesh network. Scheduling is required to ensure that the nodes of the network be synchronized in time. Through appropriate time synchronization, guard intervals separating communications upon a radio link can be reduced as the synchronization limits the amount of drifting of bursts of packet data beyond a defined transmission period. Without proper synchronization, guard intervals of increased sizes are required, thereby reducing the communication capacity upon the radio links formed between nodes of the network.

In a mesh network, a formal hierarchy is not necessarily defined. And, if a hierarchy is defined, reference distribution, pursuant to which synchronization is performed, is implemented hierarchically. Reference errors increase accumulatively in successive branches of the hierarchically-defined structure.

A manner by which to provide a systematic reference by which to effectuate time synchronization in a mesh network, such as a fixed broadband access network or a moving ad-hoc mesh network would therefore be advantageous.

It is in light of this background information related to communications in a mesh network that the significant improvements of the present invention have evolved.

SUMMARY OF THE INVENTION

The present invention, accordingly, advantageously provides apparatus, and an associated method, by which to facilitate time synchronization between nodes of a mesh network, such as a fixed broadband access network or a moving ad-hoc mesh network.

Through operation of an embodiment of the present invention, accurate time reference indicia is provided to the nodes of the mesh network to permit time and clock synchronization pursuant to a synchronization hierarchy.

An updated time reference value is maintained at a node of the mesh network. The time reference value is used as a time stamp which is added to data packets which are to be communicated by the node to another node. When sent to the other node, the time stamp is extract to provide the other node with the updated time reference value. The time reference value is maintained at the first node at a register and is selectably retrieved therefrom to be used the time stamp.

In one aspect of the present invention, a network time register is positioned at a first node formed of a first communication station of the mesh network. A clock signal is applied to the network time register, and the contents of the network time register are incremented, either positively or negatively, thereby to maintain an update at the register of an updated time reference value. At least selected data packets are time-stamped with time reference values retrieved from the network time register. When the data packets are communicated to a second, or other, node formed of another communication station, the time stamp is extracted from the data packet and used to time synchronize the other communication station to the first communication station.

Delay between the send time, i.e., the time at which the data packet is sent by the first communication station and the receive time, i.e., the time at which the data is received at the second communication station, is compensated for by calculation of the transmission duration. Calculation is made by returning a data packet from the second communication station to the first communication station. The time at which the returned data packet is received at the first communication station permits determination of the transmit time between the two communication stations. An additional data packet is sent to the second communication station to inform the second communication station of the transmission time period and the corresponding alteration of the time reference value which should be maintained at the second communication station.

In another aspect of the present invention, an additional register, a latch register, is also formed at the first communication station. The network latch register is coupled to the network time register, and time reference values buffered and maintained at the network time register are also selectably storable at the network latch register. The values are retrieved and latched thereat upon application to the latch register of a trigger signal. When the trigger signal is applied to the latch register, the contents of the network time register are copied thereto.

In another aspect of the present invention, a network strobe register is also formed at the first communication station. The strobe register is also coupled to the network time register to receive values of the reference time stored thereat. The strobe register counts out and generates a signal which forms the trigger signal when the register counts out. Thereby, at periodic intervals, when the strobe register counts out, a trigger signal is generated and applied to latch register.

Registers, either implemented as hardware devices or as software devices, formed at a communication station in a mesh network provide a manner by which to maintain, and update, a time reference value. By time-stamping selected data packets which are communicated by the communication station to another communication station, time synchronization therebetween is provided. And, when successive nodes, i.e., communication stations of the mesh network include such registers, network-wide synchronization is implementable. A pseudo-hierarchy is also provided by defining a one of the communication stations to maintain the reference time value.

In these and other aspects, therefore, apparatus, and an associated method, is provided for a wireless mesh network having a first communication station and at least a second communication station. Time-synchronization of communication of data between the first and least second communication stations is provided. A network time register is coupled to receive a time reference signal of values representative of a reference time. The network time register buffers and maintains updated values of the reference time. A data formatter is coupled to the network time register. The data formatter formats the data to be communicated between the first and least second communication stations of the wireless mesh network. The data, once formatted, includes indicia associated with the updated values of the reference time buffered at the network time register.

A more complete appreciation of the present invention and the scope thereof can be obtained from the accompanying drawings which are briefly summarized below, the following detailed description of the presently-preferred embodiments of the invention, and to the appended claims.

BRIEF DESCRIPTION OF THE DRAWINGS

FIG. 3 illustrates a functional block diagram, similar to that shown in FIG. 2, of timing circuitry of an alternate embodiment of the present invention.

FIG. 4 illustrates a functional block diagram of an implementation of the timing circuitry of the embodiment shown in FIGS. 2 and 3.

DETAILED DESCRIPTION OF THE INVENTION

Figure 1:
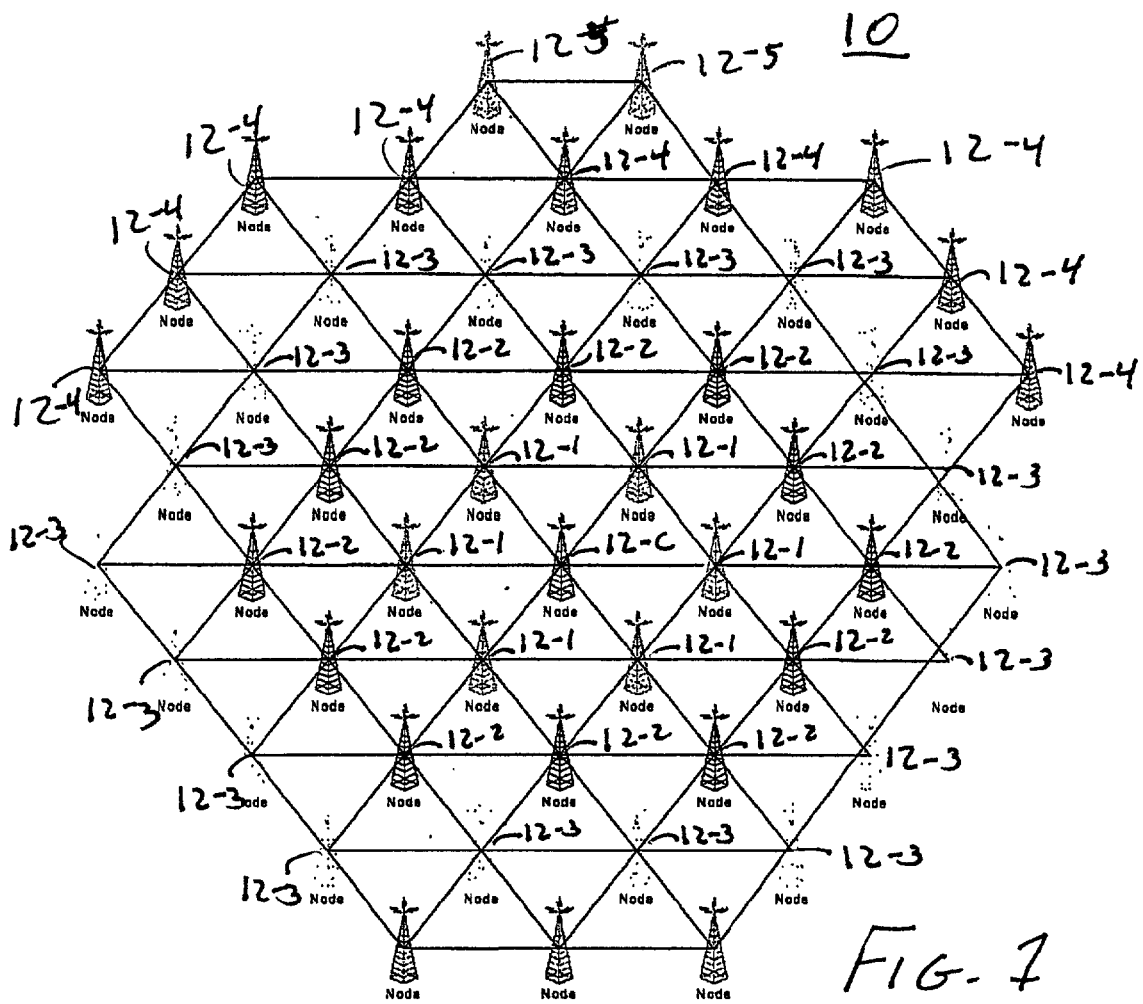
FIG. 1 illustrates a functional block diagram of an exemplary wireless mesh network in which an embodiment of the present invention is operable.

Referring first to FIG. 1, an exemplary wireless mesh network, shown generally at 10, provides for wireless communications between a plurality of nodes 12 which collectively form the mesh network. In the exemplary implementation, the wireless mesh network forms a fixed wireless broadband access network. In another implementation, the mesh network 10 is representative of a mobile ad-hoc network.

Each of the nodes 12 forms a wireless communication station capable of transceiving communication signals with other communication stations. When the mesh network provides for packet data communications, the communication stations are operable to communication packet data therebetween.

While a mesh network does not necessarily contain a hierarchy, the mesh network 10 shown in the figure defines a pseudo-hierarchy relative to a center (as-shown) communication station 12-C. The communication station 12-C forms a reference node. Distances from the reference node from other nodes are defined in terms of hops.

With respect to the reference node 12-C, a first set of nodes formed of communications, in here shown at 12-1 are positioned at one-hop distance from the reference node 12-C. Another set of communication stations formed for the nodes, here shown at 12-2, are two-hop distances from the reference node 12-C. And, a third set of communications stations formed of the nodes, and here shown at 12-3 are at three-hope distances from the reference node 12-C. Nodes 12-4 and 12-5 are analogously numbered responsive to their respective hop distances from the reference node.

While only a single reference node 12-C is represented in FIG. 1, a pseudo-hierarchy formed of multiple references can also be defined in a wireless mesh network. In such an implementation, to the simplistic hop-distribution shown in FIG. 1 with respect to a signal reference node is not utilized. But, in such an implementation, a single node synchronizes, for example, to its neighbors with a lowest distance to a reference node.

To provide for efficient utilization of the radio resources allocated to the mesh network, appropriate levels of time synchronization are required to be effectuated in the mesh network. An embodiment of the present invention provides for time and clock synchronization pursuant to a pseudo-hierarchy which provides appropriate levels of synchronization between the nodes of the mesh network to permit efficient synchronization of the radio resources allocated to the network. The manner by which the synchronization is provided permits a mesh network utilizing more than one synchronization source to effectuate time synchronization as well as also to provide a reference to various destination nodes.

Figure 2:
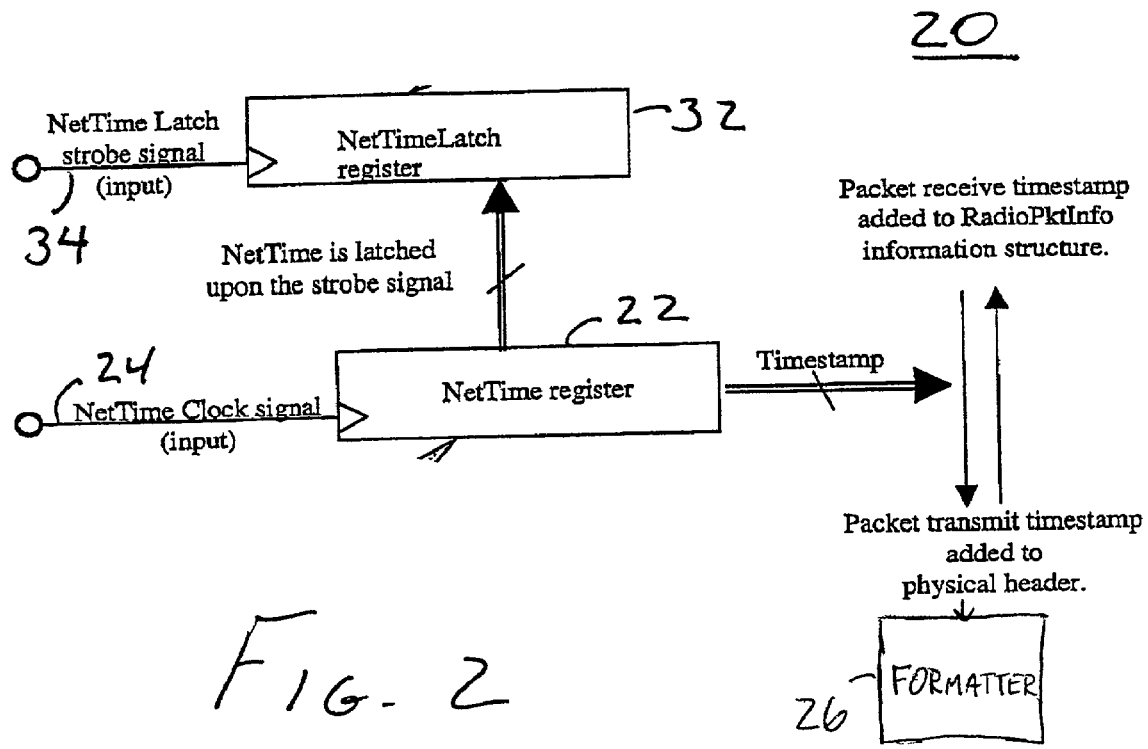
FIG. 2 illustrates a functional block diagram of exemplary network timing circuitry of an embodiment of the present invention.

FIG. 2 illustrates timing circuitry, shown generally at 20, of an embodiment of the present invention. The timing circuitry is functionally represented and can be implemented in any desired manner, both software implementations, hardware implementations, and combinations both hardware and software implementations. In the exemplary implementation, the timing circuitry 20 is implemented at one or more of the nodes of the of the mesh network. In the implementation shown in FIG. 1 which shows a signal reference formed of the communication station forming the node 12C, the timing circuitry is formed at least at the reference node 12-C. To permit synchronization of data packets communicated over several hops between nodes, other of the communication stations forming others of the nodes also includes the timing circuitry 20.

The circuitry 20 includes a network time register 22 of a register size capable of buffering a clock value which defines a reference time. An input clock signal here generated on the line 24 is applied to the register 22 to alter the buffered time reference value stored in the register.

Time reference values maintained at the register 22 are accessible, here by a data formatter 26 to retrieve the reference values buffered at the register 22 and to add values representative of the time reference values to data packets into which data formatted by the data formatter is formatted. The time reference values form time stamps. And, the time stamp is representative of a reference time and is included in the header portion of outgoing, or incoming, data packets. When added to an outgoing data packet, the time stamp information is added into the packet, and when added into an incoming data packet the time stamp information added as a separate indication of the reception time at which the data packet is received at the node at which the circuitry 20 is formed.

The time reference value buffered at the network time register 22 is incremented for each clock cycle of the clock signal applied thereto. Not all of the least significant bits of the buffered value need to be available if the precision time stamp value to be added to a data packet does not require that the least significant bit, or bits, be used. By selectably selecting the number of bits to be used in the time stamping function, the circuitry 20 can be used over a broad range of frequencies, enabling different kinds of reference signals.

The circuitry 20 further includes a latch register 32. The latch register is coupled to the network time register 22 and is selectably operable to retrieve and latch in the latch register a time reference value buffered and maintained at the register 22. The latch register latches a value of the time reference value buffered at the register 22 upon application of a trigger signal thereto on the line 34. Upon application of the trigger signal on the line 34 to the latch register 32, the contents of the network time register 22 are copied into the latch register 32 and maintained thereat. When the trigger signal is generated upon the occurrence of a selected event, the time reference valued stored at the latch register is representative of the time of occurrence of the selected event. Thereby, an accurate reading of when a certain event occurred is stored at the latch register 32. Access to the time of occurrence of the event is available for subsequent analysis or processing.

Several output sources are able to be synchronized to a single input source thereby. The input source would, e.g., become a master of the network time register 22. Each of the time stamping circuitry of the respective output sources are accessible to the network time register 22 in manners analogous to the manner by which the time stamp circuitry of the data formatter 26 shown in FIG. 1 is capable of accessing the time reference value buffered at the network time register 22. If the output sources are positioned at different devices, such as on different integrated circuitry chips or different integrated circuitry boards, synchronization is obtained by providing the clock signal generated on the line 24 and the trigger signal applied on the line 34 on each of the output sources. The clock signal generated on the line generated on the line 24 provides a time base. And, by generating the trigger signal upon the occurrence of the selected event, a time reference value is latched at the latch register.

FIG. 3 illustrates the timing circuitry of a further embodiment of the present invention. Again, the timing circuitry includes the network time register 22 and the latch register 32. And, the network time register is coupled to a data formatter 26 which includes time stamping circuitry for selectably time stamping selected data packets. The line 24 upon which the clock signal is generated for application to the register 22 is again shown.

Here, the timing circuitry 20 further includes a strobe register 42. The strobe register 42 is coupled to the network time register and selectably buffers a value retrieved from the network time register thereat. When the register counts out, a strobe signal is generated on the line 34 which forms the trigger signal which is applied to the latch register 32. In this implementation, the trigger signal causes a value of the period length between the generation of two trigger signals to be written into the register 32, and the trigger signals are generated periodically with a high degree of accuracy.

FIG. 4 illustrates circuitry 40 representative of a multiple-device configuration in which the timing circuitry shown in FIG. 2 or 3 are implemented. Here, a clock oscillator in which the timing circuitry shown in FIG. 2 or 3 are implemented. Here, a clock oscillator 41 generates a clock signal on the lines 24 which are applied to clock pins 42 at circuit devices 44, 46 and 48. A trigger signal, generated at the circuit device 48 is applied to strobe pins 52 of the devices 46 and 48. The circuit devices 44, 46, and 48 are representative of any of a large variety of devices, such as a radio interface, ethernet and a GPS (global positioning system) receiver.

Figure 5:
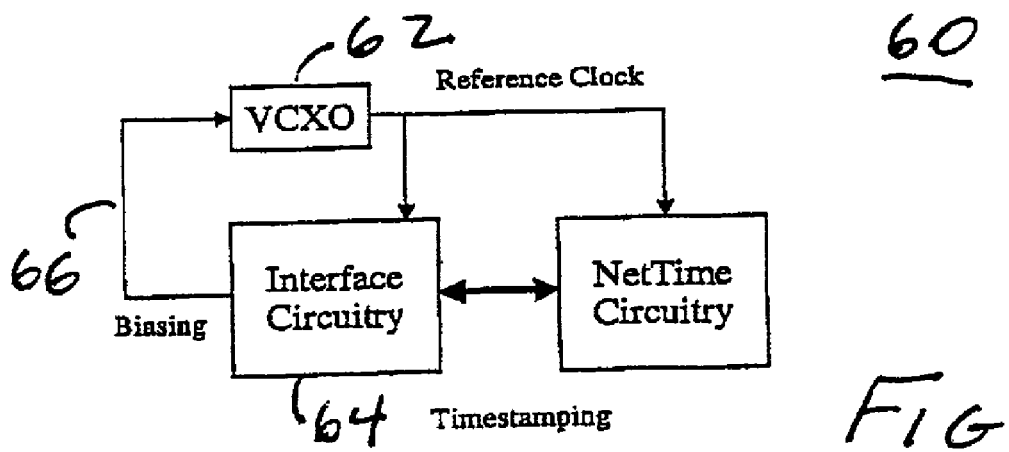
FIG. 5 illustrates a functional block diagram of clock synchronization circuitry of an embodiment of the present invention.

FIG. 5 illustrates clock synchronizations circuitry 60 which includes the timing circuitry 20 shown previously in FIGS. 2 and 3. Here, a reference clock signal is generated by a voltage-control clock oscillator (VCXO) 62. The clock signal is applied to the timing circuitry 20. And, time stamping is provided by the timing circuitry. The circuitry 60 also includes interface circuitry 64 which generates a biasing signal on the line 66 for application to the clock oscillator. The physical interface circuitry 64 tracks the frequency of an incoming signal. If the incoming signal is a synchronization reference signal, a biasing signal is generated on the line 66 to alter the oscillation frequency of the clock oscillator 62. When the oscillation frequency of the reference clock signal is corrected, the correct reference clock frequency is obtainable from the physical signal itself, or at least a calculation of the offset. When the reference clock biasing is available, the device is capable of adjusting its own reference to match the reference of the network.

Figure 6:
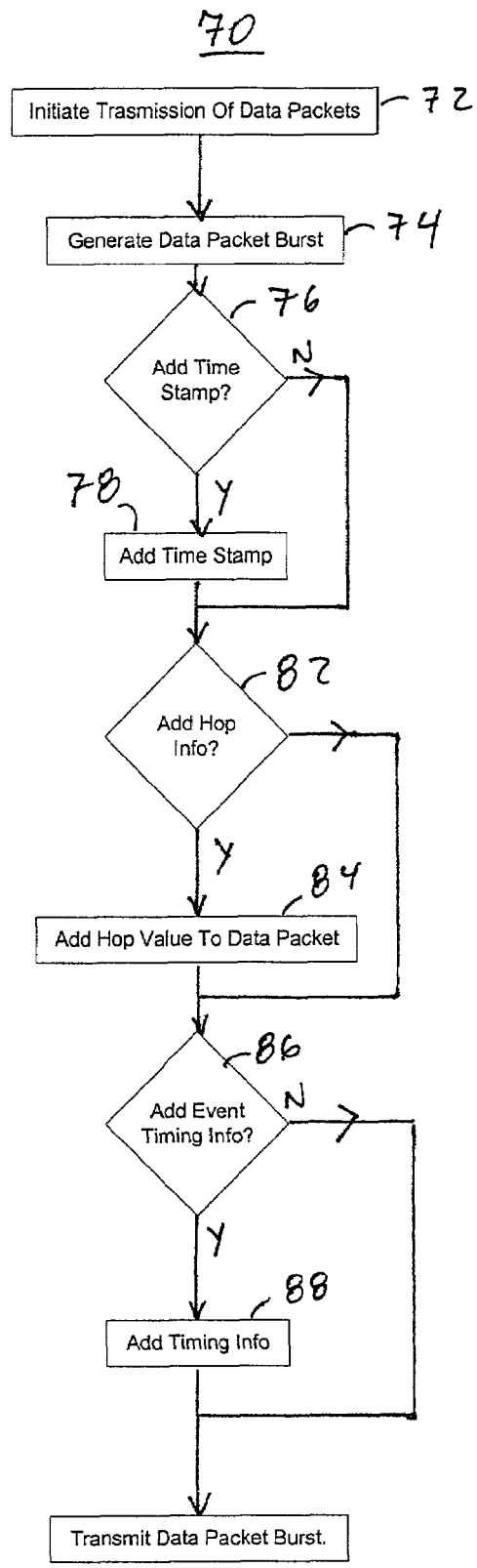
FIG. 6 illustrates a method flow diagram of the method of operation of an embodiment of the present invention.

FIG. 6 illustrates a method flow diagram, shown generally at 70, of the method of operation of an embodiment of the present invention by which to time stamp a data packet with a time reference value buffered and maintained at a network time register 22 (shown FIGS. 2 and 3).

First, and as indicated by the block 72, transmission of data packets between first and second communication stations formed of nodes of a wireless mesh network is initiated. As indicated by the block 74, a burst of data packet is generated. Then, and as indicated by the decision block 76, a determination is made as to whether a time stamp is to be added to a data packet of the burst. If so, the yes branch is taken to the block 78 and a time stamp is added to the data packet. If, conversely, a time stamp is not to be added to the data packets of the burst, no branch is taken to the decision block 82. A path is also taken from the block 78 to the decision block 82.

At the decision block 82, a determination is made as to whether hop information is to be also added to a data packet. If so, the yes branch is taken to the block 84, and a hop value associated with a number of hops is added to the data packet. A branch is then taken to the decision block 86. If, conversely, hop information is not to be added to the data packet, the no branch is also taken to the decision block 86.

At the decision block 86, a determination is made as to whether event timing information is to be added to the data packet. If so, the S branch is taken to the block 88, and timing information is added to the data packet, and a branch is taken to the block 92. If the no branch is taken from the decision block 86, a branch is also taken to the block 92. At the block 92, the data packet burst is transmitted. Then, a path is taken to the end block 94.

Figure 7:
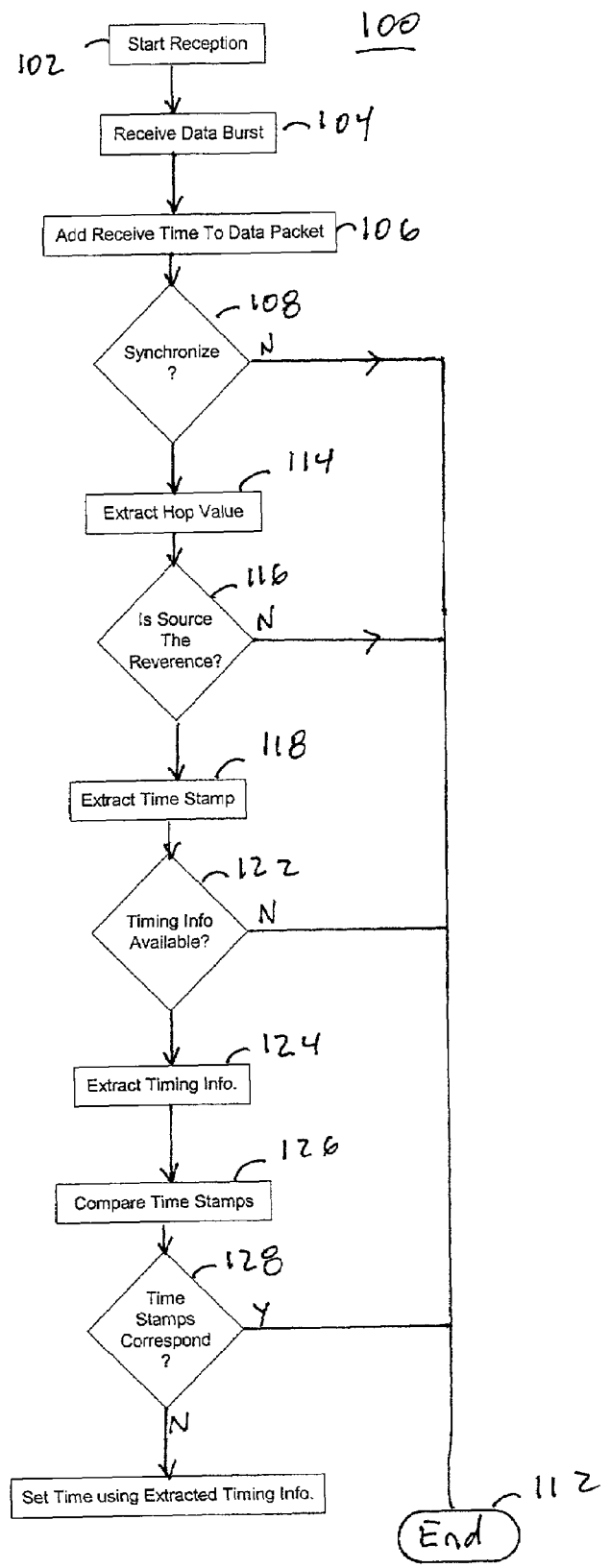
FIG. 7 also illustrates a method flow diagram, also representative of the method of operation of an embodiment of the present invention.

FIG. 7 illustrates a method, shown generally at 100, of an embodiment of the present invention by which to utilize a time stamp added to a data packet which is received at a second communication station forming a node of a mesh network, such as a mesh network shown in FIG. 1. The time stamp information is utilized to synchronize the second communication station to the first communication station from which the data packet is sent.

First, subsequent to the start reception block 102, a data burst is received, indicated by the block 104. A receive time stamp is added to the data packet, indicated at the block 106, to identify the reception time at which the data packet of the data burst is received.

Then, and as indicated at the decision block 108, a determination is made as to whether an attempt should be made to synchronize the second communication station to the first communication station. If no attempt is to be made, the no branch is taken to the end block 112. Otherwise, the yes branch is taken to the block 114 and a hop value is extracted from the data packet. Then, and as indicated by the block 116, a determination is made as to whether the source of the burst of data packets is the reference in a pseudo-hierarchical structure defined in the mesh system. If not, the no branch is taken to the end block. Otherwise, the yes branch is taken to the block 118 and the transmit time stamp contained in the data packet is extracted. Then, and as indicated by decision block 122, a determination is made as to whether timing information related to the occurrence of an event is available. If so, the yes branch is taken to the block 124 and the timing information is extracted from the data packet. Then, a branch is taken to the block 126. The no branch from the decision block 122 is also taken to the block 126.

At the block 126, the time stamps are compared. Then, at the decision block 128 a determination is made as to whether the time stamps correspond. If so, the yes branch is taken to the end block 112. Otherwise, time synchronization is performed by taking the no branch to the block 132 and the timing information at the second communication station is set using the time information extracted from the data packet received at the communication station.

Figure 8:
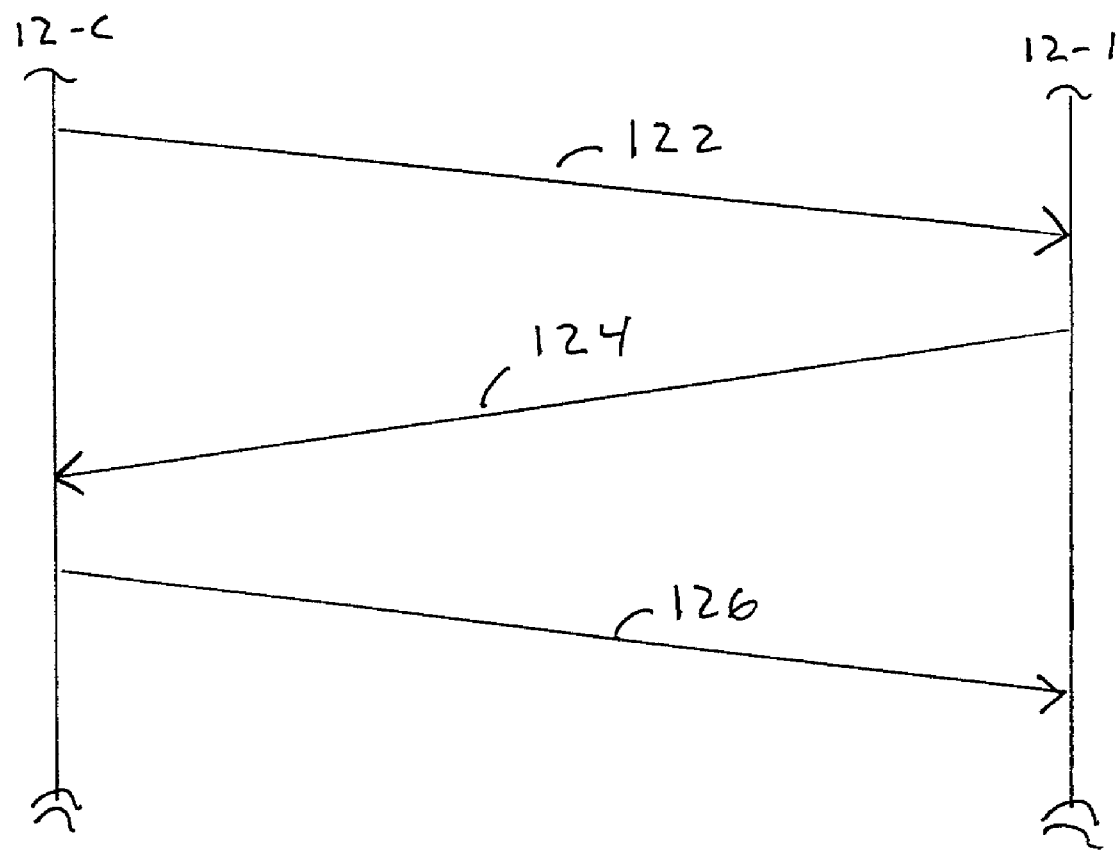
FIG. 8 illustrates a representation of communications between first and second nodes of the exemplary wireless mesh network shown in FIG. 1.

FIG. 8 illustrates signaling between two of the communication stations forming nodes in the mesh network 10 shown in FIG. 1 pursuant to synchronization operations effectuated during operation of an embodiment of the present invention. Here, data packets are communicated between the reference node 12-C and a node 12-1 positioned at a one-hop distance away from the reference node. A data burst including at least one data packet to which a time stamp has been added in manners as above described, is sent by the reference node to the 12-C, as indicated by the arrow 122. The data packet is received at the node 12-1, and the time stamp information is extracted therefrom, also as described above. An acknowledgment burst is returned by the node 12-1 to the reference node 12-C, here indicated by the segment 124. By providing the acknowledgement burst back to the reference node, the propagation delay in the propagation of the data from the reference node to the node 12-1. When the acknowledgement packet is received at the reference nodes 12-C, a cumulative timing error corresponding to twice the propagation delay is contained in the signal. The reference node is able to calculate the propagation delay responsive to the timing information contained in the acknowledgement packet and thereafter generate a message, here represented by the segment 126, which includes a correction factor correcting for the propagation delay. Thereby, the node 12-1 becomes completely time synchronized with the reference node.

Multiple-hop communication of a data packet between successive nodes of the mesh network shown in FIG. 1.

Transmission of the data packet occurs during a time slot. First, for instance, the reference node 12-C is sent to a node 121. The transmission of the data packet is advanced by the propagation time required to transmit the data packet to the nodes 12-1. The packet transmission is initiated prior to the start of the slot. The node 12-1 passes on the data packet to a subsequent node, e.g., a node 12-2. And, transmission by the node 12-1 occurs at the start of the time slot due to the propagation delay in transmission from the reference node to the node 12-1. Then, once received at the subsequent node 12-2, the data packet is forwarded on to another of the nodes, e.g., a node 12-3. The propagation delay in communication of the data packet between the nodes 12-1 and 12-2 causes additional delay prior to forwarding the data packet to the node 12-3.

Thereby, through operation of an embodiment of the present invention, a manner is provided by which to provide accurate time reference indicia to the nodes of the mesh network to permit time and clock synchronization pursuant to a pseudo hierarchy using one or more references.

The previous descriptions are of preferred examples for implementing the invention, and the scope of the invention should not necessarily be limited by this description. The scope of the present invention is defined by the following claims.

What is claimed is:

1. In a wireless mesh network having a first communication station and at least a second communication station, an improvement of apparatus for time-synchronizing communication of data between the first and at least second communication stations, respectively, said apparatus comprising:
  a network time register coupled to receive a time reference signal of values representative of a reference time, said network time register for buffering and maintaining updated values of the reference time; and
  a data formatter coupled to said network time register, said data formatter for formatting the data to be communicated between the first and at least second communication stations of the wireless mesh network, the data, once formatted, including indicia associated with the updated values of the reference time buffered at said network time register,
  further comprising a latch register coupled to said network time register, said latch register for latching buffered values of the reference time buffered at said network time register.

2. The apparatus of claim 1 wherein a trigger signal is selectably applied to said latch register, and wherein the updated values of the reference time are buffered at said latch register and latched thereat upon application of, the trigger signal to said latch register.

3. The apparatus of claim 2 wherein the trigger signal is applied to said latch register responsive to occurrence of a selected event, buffering and latching at said latch register event-driven responsive to the occurrence of the selected event.

4. The apparatus of claim 3 wherein the latched values buffered at said latch register are accessible by at least a selected one of the first and at least second communication stations, the values accessible thereat representative of the reference time at which the selected event occurs.

5. The apparatus of claim 1 wherein said network time register forms a portion of a selected one of the first and at least second communication stations and wherein the selected one of the first and at least second communication stations at which said network time register is formed forms a time-reference communication station used by a nonselected at least one of the first and at least second communication stations to be synchronized thereto.

6. The apparatus of claim 1 wherein the data communicated between the first communication station and the at least the second communication station comprises packet data and wherein said data formatter formats the data into data packets of which at least selected ones of the data packets include the indicia associated with the updated values of the reference time.

7. The apparatus of claim 4 further comprising a strobe register coupled to said network time register, said strobe register for generating the trigger signal which is selectably applied to said latch register.

8. The apparatus of claim 7 wherein said strobe register is set with a strobe value, and wherein the trigger signal is generated each time in which the strobe value counts out.

9. The apparatus of claim 1 further comprising a clock oscillator, said clock oscillator for generating the time reference signal, values of which said network time register is coupled to receive.

10. The apparatus of claim 9 further comprising interface circuitry coupled to said clock oscillator and to said network time register, said interface circuitry coupled to receive an externally-generated master clock signal, and said interface circuitry for selectively biasing the clock oscillator to alter the time reference signal generated thereat.

11. The apparatus of claim 10 wherein said network time register, said data formatter, said clock oscillator, and said interface circuitry are formed at a selected one of the first communication station and the at least the second communication station and wherein the externally-generated master clock signal is generated by an other of the first and at least second communication stations, respectively.

12. In the wireless mesh network of claim 11, a further improvement of apparatus for the other of the first and at least second communication stations, said apparatus comprising an extractor for extracting the indicia associated with the updated values of the reference time when the data is communicated to the other of the first and at least second communication stations.

13. The apparatus of claim 12 wherein said network time register comprises a first network time register formed at the selected one of the first and at least second communication stations and a second time register formed at the other of the first and at least second communication stations, and wherein said data formatter comprises a first data formatter formed at the selected one of the first and at least second communication stations and a second data formatter formed at the other of the first and at least second communication stations.

14. In a method for communicating in a wireless mesh network having a first communication station and at least a second communication station, an improvement of a method for time-synchronizing communication of data between the first and at least second communication stations, respectively, said method comprising:
  buffering and maintaining updated values of a reference time responsive to reception of a time reference signal of values representative of a reference time; and
  formatting the data to be communicated between the first and at least second communication stations of the wireless mesh network, the data, once formatted, including indicia associated with the updated values of the reference time buffered during said buffering,
  further comprising the operation of latching a buffered value of the reference time buffered during said buffering.

15. The method of claim 14 further comprising the operation of selectably generating a trigger signal and wherein said operation of latching is performed responsive to generation of the trigger signal.

16. The method of claim 15 wherein said operation of selectably generating the trigger signal is performed responsive to occurrence of a selected event.

17. The method of claim 14 wherein the data to be communicated between the first and at least second communication stations comprises packet data and wherein said operation of formatting comprises adding the indicia associated with the updated values of the reference time to at least select ones of data packets of the packet data.

18. The method of claim 17 wherein said operations of buffering and formatting are performed at the first communication station and wherein said method further comprises the operations of:

sending the packet data to the second communication station;

extracting the indicia associated with the updated values of the reference time from the at least selected ones of the data packets; and using the indicia extracted during said operation of extracting to synchronize the second communication station to the reference time buffered during said operation of buffering and maintaining.

* * * * *